(12) United States Patent
Fujii et al.

(10) Patent No.: US 9,047,122 B2
(45) Date of Patent: Jun. 2, 2015

(54) INTEGRATING SERVER AND STORAGE VIA INTEGRATED TENANT IN VERTICALLY INTEGRATED COMPUTER SYSTEM

(71) Applicant: Hitachi, Ltd., Tokyo (JP)

(72) Inventors: Tetsuhiko Fujii, Tokyo (JP); Masanori Araki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/238,923

(22) PCT Filed: Apr. 2, 2013

(86) PCT No.: PCT/JP2013/060021
§ 371 (c)(1),
(2) Date: Feb. 14, 2014

(87) PCT Pub. No.: WO2014/162497
PCT Pub. Date: Oct. 9, 2014

(65) Prior Publication Data
US 2015/0052535 A1    Feb. 19, 2015

(51) Int. Cl.
*G06F 9/46*    (2006.01)
*G06F 9/50*    (2006.01)

(52) U.S. Cl.
CPC ... *G06F 9/50* (2013.01); *G06F 9/46* (2013.01)

(58) Field of Classification Search
CPC .................................................. G06F 11/0709
See application file for complete search history.

(56) References Cited

U.S. PATENT DOCUMENTS

| 2012/0089804 | A1 | 4/2012 | Ikegaya et al. | |
| 2012/0144454 | A1* | 6/2012 | Lee | 726/4 |
| 2012/0150912 | A1* | 6/2012 | Ripberger | 707/786 |
| 2012/0254445 | A1 | 10/2012 | Kawamoto et al. | |
| 2012/0311120 | A1* | 12/2012 | Yasuda et al. | 709/223 |
| 2012/0311311 | A1* | 12/2012 | Asahara | 713/1 |

FOREIGN PATENT DOCUMENTS

| JP | 2000-276406 A | 10/2000 |
| JP | 2012-079245 A | 4/2012 |
| JP | 2012-220977 A | 11/2012 |

* cited by examiner

*Primary Examiner* — Meng An
*Assistant Examiner* — James J Lee
(74) *Attorney, Agent, or Firm* — Volpe and Koenig, P.C.

(57) ABSTRACT

[Object] A computer system in which a server and a storage apparatus are integrated and operated is designed so that a multi-tenant can be realized favorably.
[Solution] The present invention provides an integrated computer system in which a business server and a storage apparatus for providing the business server with a storage area are integrated and operated; and the integrated computer system includes a management server for managing the business server and the storage apparatus; wherein the management server sets an integrated tenant which extends across the business server and the storage apparatus, the business server sets a server tenant belonging to the integrated tenant, the storage apparatus sets a storage tenant belonging to the integrated tenant, and the server tenant and the storage tenant are associated with each other by the integrated tenant.

7 Claims, 19 Drawing Sheets

FIG. 7

| SERIAL NUMBER | TENANT NAME | TENANT ID | NECESSARY SERVER RESOURCE INFORMATION | SERVER TENANT ID | NECESSARY STORAGE RESOURCE INFORMATION | STORAGE TENANT ID |
|---|---|---|---|---|---|---|
| 001 | A Bank | 00001 | INFORMATION SUCH AS CPU, MEMORY, AND NUMBER OF I/O PATHS | LPAR1 | INFORMATION SUCH AS HDD CAPACITY AND CACHE CAPACITY | RSG1 |
| 002 | B Ltd. | 00002 | SAME AS ABOVE | LPAR 2 | SAME AS ABOVE | RSG2 |

FIG. 8

INTEGRATED MANAGEMENT TOOL · SERVER MANAGEMENT TOOL · STORAGE MANAGEMENT TOOL

S8000: INQUIRE HBA VWWN LIST INCLUDED IN SERVER TENANT OF SERVER MANAGEMENT TOOL

S8002: SERVER MANAGEMENT TOOL CHECKS VWWNS OF HBAS AND RESPONDS TO INTEGRATED MANAGEMENT TOOL

S8004: SEND VWWN LIST TO STORAGE AND REQUEST STORAGE TO SET LUN SECURITY

S8006: SET VWWN LIST AS HOST GROUP OF STORAGE TENANT. ASSOCIATE HOST GROUP WITH LUS IN STORAGE TENANT.

FIG.9

| SERIAL NUMBER | LPAR NUMBER | LPAR CONFIGURATION INFORMATION | INTEGRATED TENANT ID |
|---|---|---|---|
| 001 | LPAR1 | INFORMATION SUCH AS CPU, MEMORY, AND NUMBER OF I/O PATHS | 00001 |
| 002 | LPAR2 | SAME AS ABOVE | 00002 |

FIG. 10

| SERIAL NUMBER | RESOURCE GROUP NUMBER | RESOURCE GROUP CONFIGURATION INFORMATION | INTEGRATED TENANT ID |
|---|---|---|---|
| 001 | RSG1 | INFORMATION SUCH AS LOGICAL VOLUMES AND HOST CONNECTING PORTS | 00001 |
| 002 | RSG2 | SAME AS ABOVE | 00002 |

FIG. 11

| TENANT ID | SERVER TENANT ID | HBA WWN LIST | STORAGE TENANT ID |
|---|---|---|---|
| 00001 | LPAR1 | WWN1, WWN2, ··WWNn | RSG1 |

FIG.12

| HOST GROUP ID | WWN ADDRESS |
|---|---|
| Host group1 | WWN1<br>WWN2 |
| Host group2 | WWN3<br>WWN4 |

*FIG.13*

|  | Host group1 | Host group2 |
|---|---|---|
| LU1 | Access permit | Invisible |
| LU2 | Invisible | Access permit |

FIG. 15

| SERIAL NUMBER | TENANT NAME | TENANT ID | NECESSARY SERVER RESOURCE INFORMATION | SERVER TENANT ID | NECESSARY STORAGE RESOURCE INFORMATION | STORAGE TENANT ID | NECESSARY SAN SWITCH RESOURCE INFORMATION | SAN SWITCH TENANT ID |
|---|---|---|---|---|---|---|---|---|
| 001 | A Bank | 00001 | INFORMATION SUCH AS CPU, MEMORY, AND NUMBER OF I/O PATHS | LPAR1 | INFORMATION SUCH AS HDD CAPACITY AND CACHE CAPACITY | RSG1 | BANDWIDTH, ETC. | SAN1 |
| 002 | B Ltd. | 00002 | SAME AS ABOVE | LPAR2 | SAME AS ABOVE | RSG2 | | SAN2 |

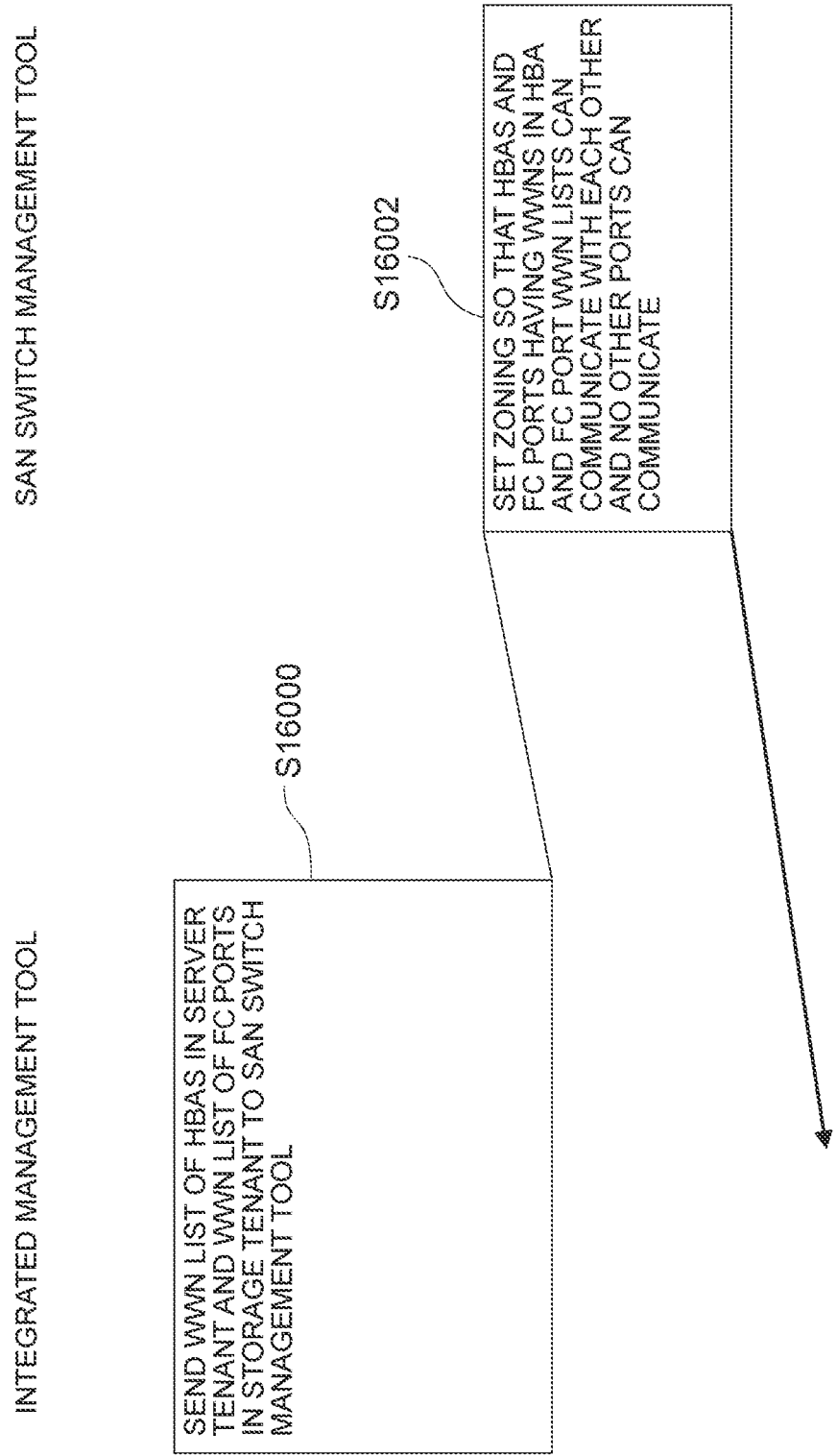

FIG. 17

| TENANT ID | SERVER TENANT ID | HBA WWN LIST | STORAGE TENANT ID | STORAGE FC PORT WWN LIST | SAN SWITCH TENANT ID |
|---|---|---|---|---|---|
| 00001 | LPAR1 | WWN1, WWN2, ..WWNn | RSG1 | WWNa, WWNb ..WWNm | SAN1 |
| | | | | | |
| | | | | | |

FIG. 19

| SERIAL NUMBER | TENANT NAME | TENANT ID | NETWORK SWITCH | SERVER | SAN SWITCH | STORAGE |
|---|---|---|---|---|---|---|
| 001 | A Bank | 00001 | SW1 NW1 | SV1 LPAR1 | SAN1 ZONE1 | DKC1 RSG1 |
| 002 | B Ltd. | 00002 | SW2 NW1 | SV1 LPAR2 | SAN2 ZONE2 | DKC1 RSG2 |
|  |  |  |  | SV2 LPAR1 |  | DKC2 RSG1 |
|  |  |  |  | SV3 LPAR1 |  | DKC3 RSG1 |
| 003 | C Telecom | 00003 | SW3 NW1 | SV3 LPAR2 | SAN3 ZONE3 | DKC3 RSG1 |

SW1, SV1, SAN1, DKC1, ETC.: DEVICE IDS
NW1, LPAR1, ZONE1, RSG1, ETC.: PARTITION IDS IN PHYSICAL DEVICES

INTEGRATING SERVER AND STORAGE VIA INTEGRATED TENANT IN VERTICALLY INTEGRATED COMPUTER SYSTEM

TECHNICAL FIELD

The present invention relates to a computer system and its control method. More particularly, the invention relates to a computer system and its control method which are suited for use in setting and operation of a multi-tenant in a vertically integrated system where a server and a storage apparatus are vertically integrated.

Recently, attention has been focused on vertically integrated systems rather than open systems as information systems. While an open system has the advantage of enabling users to freely select components such as servers, storage apparatuses, an OS, and middleware, it has the drawback of making the settings and operations of the system complicated. On the other hand, regarding a vertically integrated system, hardware such as servers, storage apparatuses, and networks is integrated with software and, for example, verifications of normal operation of the system are performed, and then the system is provided as an integrated platform from a vendor to a user, so that the system has the advantage of being capable of facilitating the operation of the system by, for example, enabling the user to introduce the system promptly. Therefore, the vertically integrated system brings benefits of the capability to reduce the user's total cost of ownership of the system.

A multi-tenant function that enables a system to be shared by a plurality of tenants is known as one operation form of a computer system. Japanese Patent Application Laid-Open (Kokai) Publication No. 2012-220977 discloses a management system fora server virtualization system, wherein the management system divides resources of the system, enables a certain group to use the divided resources, and makes it possible to distribute the resources among a plurality of groups depending on load on each group. Furthermore, similarly, there is also a known system designed with respect to a storage apparatus to divide storage resources to form resource groups so that the resource groups can be allocated to a specified tenant. Furthermore, Japanese Patent Application Laid-Open (Kokai) Publication No. 2000-276406 describes a computer system in which security is ensured by a storage apparatus by having a specified logical volume exclusively owned by a specified server tenant.

CITATION LIST

[Patent Literature]
[Patent Literature 1] Japanese Patent Application Laid-Open (Kokai) Publication No. 2012-220977
[Patent Literature 2] Japanese Patent Application Laid-Open (Kokai) Publication No. 2000-276406

SUMMARY OF INVENTION

Problems to be Solved by the Invention

With a conventional computer system as described above, a multi-tenant can be realized by logically dividing resources for a server and resources for a storage apparatus respectively, allocating each partition to tenants to realize a computer function, and having the storage apparatus ensure security of a server tenant. However, if a multi-tenant is set and operated separately for a server and a storage apparatus in a system, in which the server and the storage apparatus are vertically integrated, as in the conventional art, it is difficult to set a tenant to integrate the server with the storage apparatus vertically across them. Since it is necessary to manage and operate the server and the storage apparatus in an integrated manner in the vertically integrated system, it is desirable that tenants in the vertically integrated system should be set also in an integrated manner including the server and the storage apparatus. The problem of the vertically integrated system in a current state is that settings and operations of the multi-tenant have not been achieved yet.

So, it is an object of the present invention to implement a computer system and its control method capable of realizing a multi-tenant favorably in a computer system where a server and a storage apparatus are integrated and operated.

Means for Solving the Problems

In order to achieve the above-described object, provided according to the present invention is an integrated computer system in which a business server and a storage apparatus for providing the business server with a storage area are integrated and operated; and the integrated computer system includes a management server for managing the business server and the storage apparatus; wherein the management server sets an integrated tenant which extends across the business server and the storage apparatus, the business server sets a server tenant belonging to the integrated tenant, the storage apparatus sets a storage tenant belonging to the integrated tenant, and the server tenant and the storage tenant are associated with each other by the integrated tenant.

According to the present invention, settings and operations of the server tenant can be associated with settings and operations of the storage tenant by the integrated tenant, so that settings and operations of the multi-tenant including the server and the storage apparatus can be realized favorably in the integrated computer system where the server and the storage apparatus are operated in an integrated manner.

Advantageous Effects of Invention

According to the present invention, it is possible to provide a computer system and its control method capable of favorably realizing the settings and operations of the multi-tenant in the integrated computer system where the server and the storage apparatus are operated in an integrated manner.

BRIEF DESCRIPTION OF DRAWINGS

FIG. 7 is an example of a management table for managing an integrated tenant, a storage tenant, and a server tenant.

FIG. 8 is a ladder chart showing an example of processing for setting security (LUN security) by associating the server tenant with the storage tenant in the integrated tenant.

FIG. 9 is an example of a server tenant management table.

FIG. 10 is an example of a storage tenant management table.

FIG. 11 is an example of an LUN security management table.

FIG. 12 is an example of a host group definition information table.

FIG. 13 is an example of a LUN security definition table.

FIG. 15 is an example of a tenant management table in the computer system in FIG. 14.

FIG. 16 is a ladder chart showing an example of processing for setting security (zoning) to a SAN switch tenant between a server tenant and a storage tenant in an integrated tenant.

FIG. 17 is an example of a management table for managing the integrated tenant, the storage tenant, the server tenant, and the SAN switch tenant.

FIG. 19 is a table showing an example of local tenant IDs at each component of the vertically integrated computer system.

DESCRIPTION OF EMBODIMENTS

Figure 1:
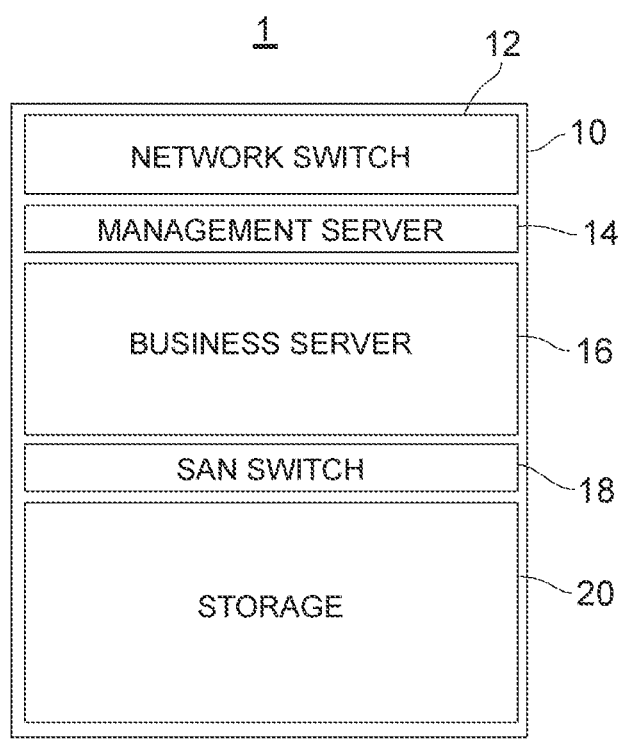
FIG. 1 is a block diagram of a vertically integrated computer system according to an embodiment of the present invention.

Next, a computer system of the present invention according to an embodiment will be explained. A computer system 1 is configured as a vertically integrated system as illustrated in FIG. 1. Specifically speaking, a business server 16 and a storage apparatus 20 are integrated and mounted in the same chassis 10 and operated in an integrated manner. The business server 16 and the storage apparatus 20 are incorporated, together with a network switch 12, a SAN switch 18, and a management server 14, into the chassis 10 and then are provided to a user after software installment, definition of configuration information, and various settings. The user operates the business server 16 and the storage apparatus 20 in an integrated manner under their control. The business server 16 and the storage apparatus 20 are connected via the SAN switch 18. The management server 14 connects to the respective management interfaces with the business server 16, the storage apparatus 20, and the SAN switch 18 via the network switch 12. Integrated management software for managing the network switch 12, the server 16, the SAN switch 18, and the storage apparatus 20 in an integrated manner is mounted in the management server 14.

Figure 2:
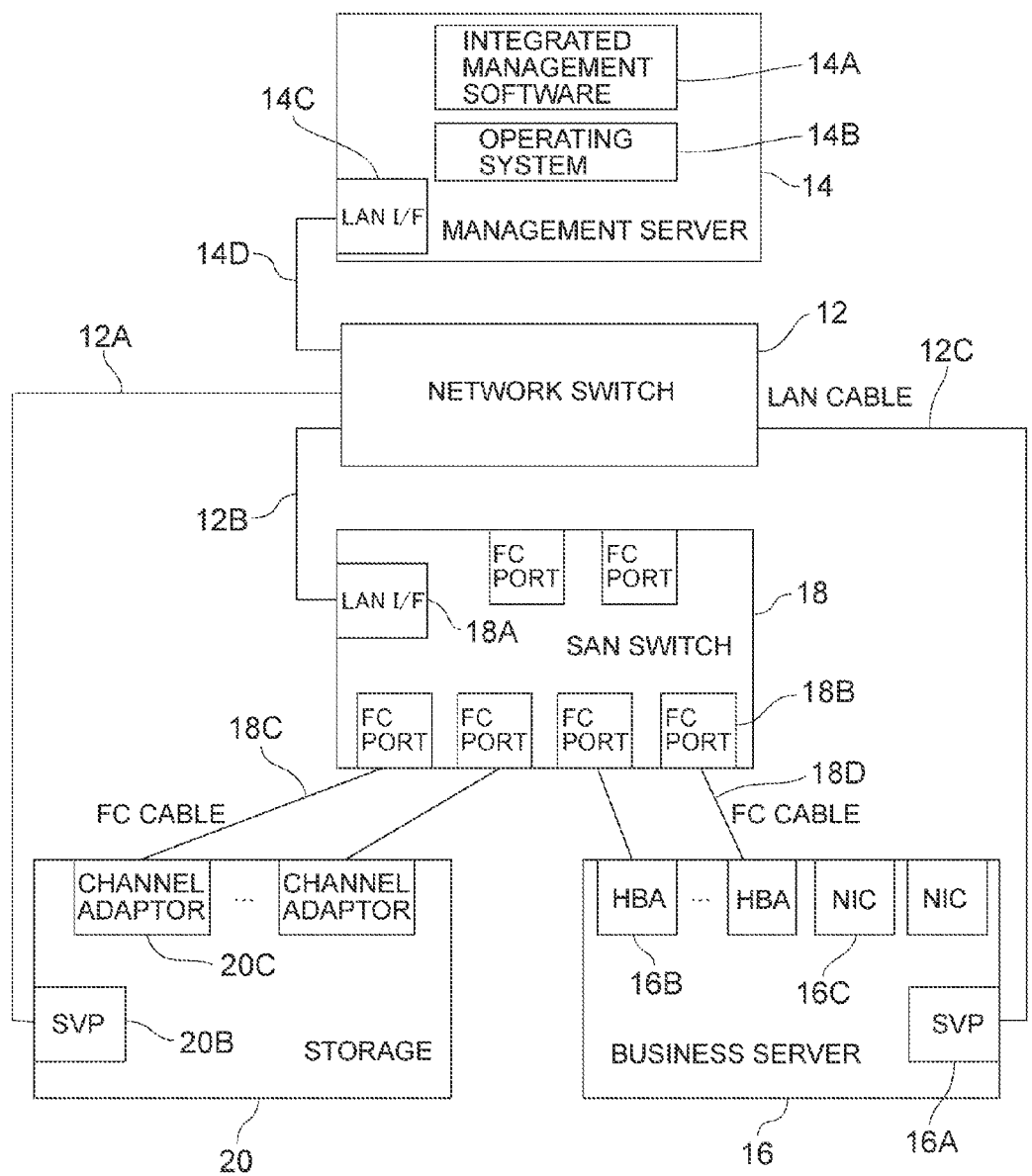
FIG. 2 is a block diagram showing a connection relationship between a plurality of components in the vertically integrated computer system in FIG. 1.

A LAN I/F 140 of the management server 14 is connected to the network switch 12 via a LAN cable 14D as illustrated in the block diagram (FIG. 2) showing a connection relationship between a plurality of components of the vertically integrated computer system. The network switch 12 is connected via a LAN cable 12B to a LAN I/F 18A of the SAN switch 18, via a LAN cable 12A to an SVP 20B of the storage apparatus 20, and via a LAN cable 12C to an SW 16A of the server 16, respectively.

The SVP 20B of the storage apparatus 20 has a LAN interface and is a service processor for controlling the entire storage apparatus by, for example, setting and changing configuration information about the storage apparatus, and for performing maintenance of the storage apparatus and operation and management of the storage apparatus. The SVP 16A of the business server 16 is also a service processor for controlling the entire server by, for example, setting and changing configuration information about the server. The management server 14 connects from the LAN I/F 14C via the network switch 12 to the business server 16, the storage apparatus 20, and the SAN switch 18, respectively, and can apply management processing to them. The management processing includes processing for setting a multi-tenant to the business server 16 and the storage apparatus 20 in an integrated manner and processing for security in association with setting of the multi-tenant. The management server 14 is equipped with integrated management software 14A on an operating system 14B.

The SAN switch 18 includes a plurality of FC ports 18B. The FC ports 18B of the SAN switch 18 are connected to channel adapters 20C of the storage apparatus 20 via FC cables 18C. Furthermore, the FC ports 18B of the SAN switch 18 are connected to adapters (HBA) 16B of the business server 16 via FC cables 18D. The business server also has LAN adapters (NIC) 16C.

It can be predicted in the context of, for example, expansion of storage capacity and I/O throughput of storage apparatuses, enhancement of servers' throughput, and the advance of a virtualization technique to enable on-demand use of the servers that a vertically integrated system will be operated in a form where it is shared by a plurality of divisions or users. This form of control processing for the shared use is called a multi-tenant. The storage apparatus 20 supports a resource group function that can manage LDEVs, parity groups, external volumes, ports, and host groups by dividing them into groups. The storage apparatus 20 realizes the multi-tenant by allocating tenants to a plurality of resource groups, respectively.

The business server 16 supports a function that divides resources such as CPUs and memories into a plurality of logical partitions (LPARs) and having them used by a plurality of OS's. The business server 16 realizes the multi-tenant by allocating tenants to the plurality of LPARs, respectively. The business server 16 may realize the multi-tenant by means of a virtual computer system.

The multi-tenant function of the storage apparatus 20 and the multi-tenant function of the server 16 are designed as respectively independent functions and how the multi-tenant function should be set and operated in the vertically integrated system has not been found. So, the management server 14 is designed to be capable of setting a tenant, in which the business server 16 and the storage apparatus 20 are integrated, to the business server 16 and the storage apparatus 20 in an integrated manner. Then, the management server 14 can set settings in an integrated manner to ensure security between different tenants in the multi-tenant.

Figure 3:
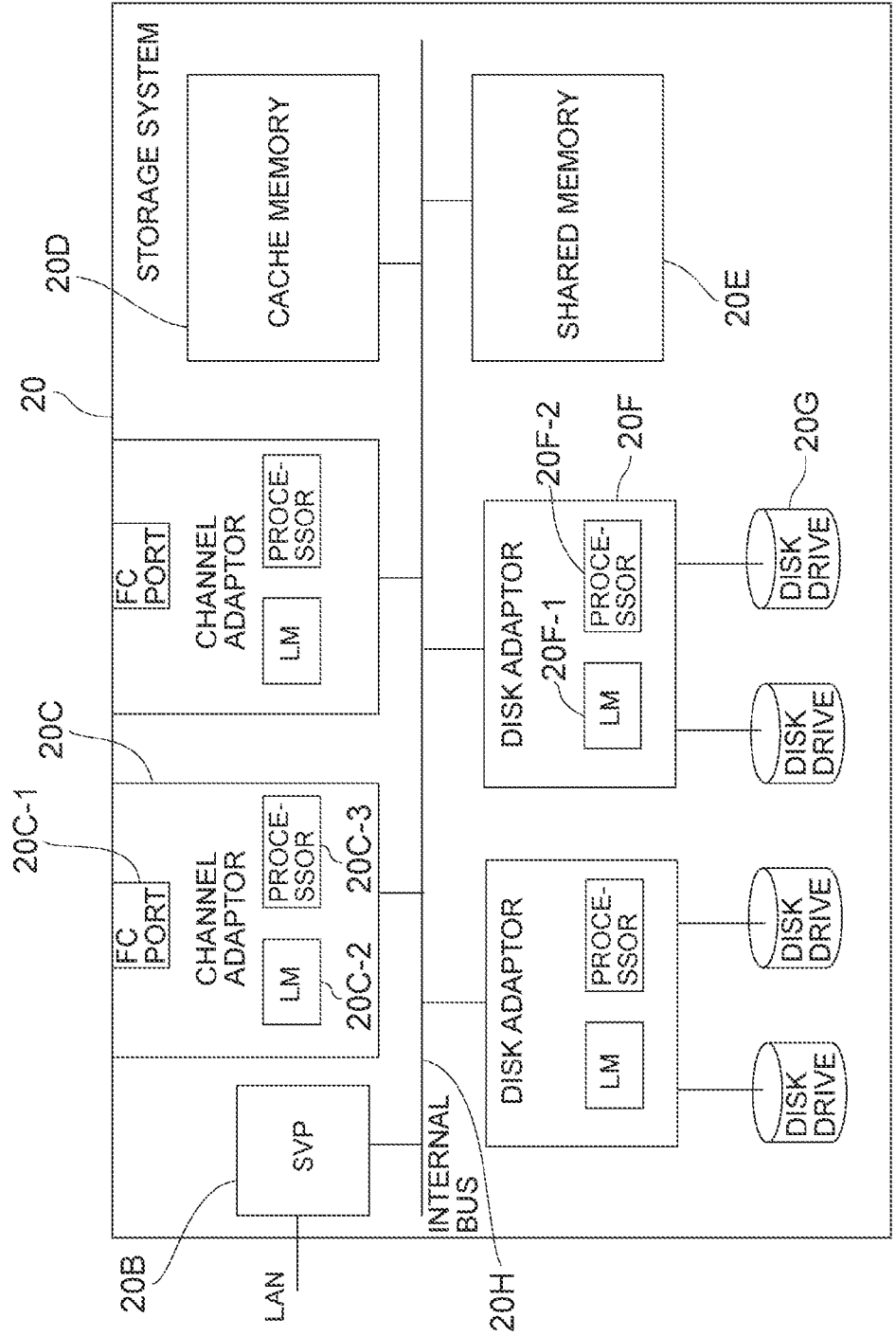
FIG. 3 is a block diagram illustrating an example of a hardware configuration of a storage apparatus.

A hardware block configuration of the storage apparatus 20 is illustrated in FIG. 3. The storage apparatus has a plurality of channel adapters 20C and the channel adapter 20C includes an FC port 20C-1 connected to the FC cable 18C, a local memory (LM) 20C-2, and a processor 20C-3. The processor 20C-3 executes a microprogram stored in the local memory and thereby controls transmission and receipt of data and FC commands to and from the business server 16 via the SAN switch 18.

The storage apparatus 20 has a plurality of disk adapters 20F and the disk adapter 20F includes a local memory 20E-1 and a processor 20E-2. The processor 20E-2 executes a microprogram of the local memory 20E-1 and thereby controls reading/writing data from/to disk drives 20G and controls the disk drives.

The cache memory 20D temporarily stores data sent to, and received from, the host server 16. The shared memory 20E records control information shared with the plurality of channel adapters 20C and the plurality of disk adapters 20F. Each component of the storage apparatus is connected by an internal bus 20H. The SW 20B connects to the internal bus 20H and sets and updates control management information such as control tables and management tables for the local memories 20C-2 of the channel adapters 20C, the local memories 20E-1 of the disk adapters 20F, and the shared memory 20E. Incidentally, control programs of the local memories 20C-2, 20E-1 may be retained in the shared memory 20E. Moreover, shared information in the shared memory 20E may be distributed to the plurality of local memories. The configuration of the storage apparatus 20 is not particularly limited as long as its resources can be grouped to form a plurality of resource groups.

Figure 4:
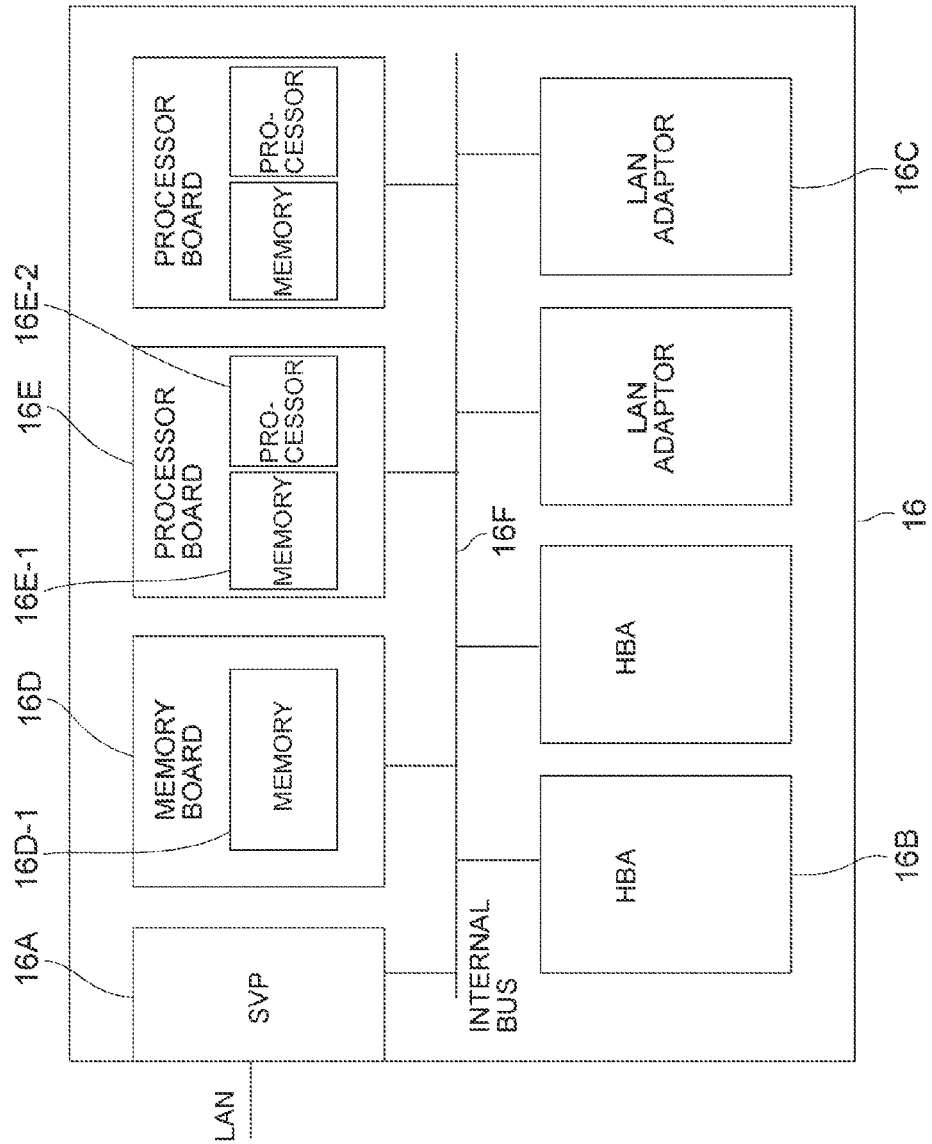
FIG. 4 is a block diagram illustrating an example of a hardware configuration of a business server.

FIG. 4 is a hardware block diagram of the business server 16. The business server 16 is configured by including a plurality of processor boards 16E, a memory board 16D, FC adapters (HBA: Host Bus Adapters) 16B, LAN adapters (NIC) 16C, and an SVP 16A as a management tool. The SVP 16A has a LAN interface and assumes various functions for maintenance, operation, and management of the server by, for example, setting and changing the configuration of the business server. The management server 14 can execute these various functions via the SVP 16A. The processor board 16E has a local memory 16E-1 and a processor 16E-2. The memory board 16D has a data recording memory 16D-1. The adapters 16B, 16C, the memory board 16D, the processor board 16E, and the SVP 16A are connected to each other via an internal bus 16F.

Figure 5:
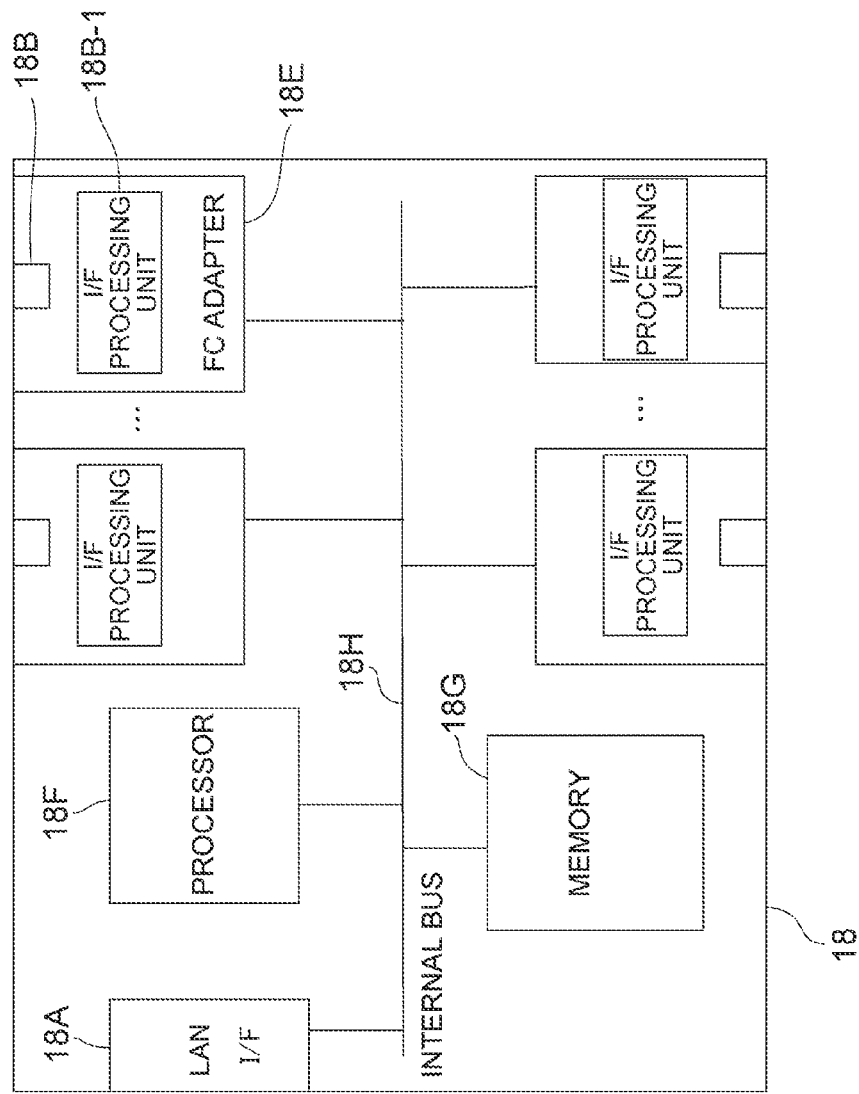
FIG. 5 is a block diagram illustrating an example of a hardware configuration of a SAN switch.

As illustrated in FIG. 5 which shows a hardware block of the SAN switch 18, each of a plurality of FC adapters 18E includes an FC port 18B and an I/F processing unit 18B-1. The FC port 18B is an I/F for connecting the FC cables 18C, 18D. The I/F processing unit 18B-1 executes FC protocol processing on FC devices connected to the SAN switch 18. The SAN switch 18 further includes a processor 18F, a memory 18G, and a LAN I/F 18A which are connected to each other together with the FC adapters 18E by an internal bus 18H.

The FC switch 18 relays communication between devices connected to the FC ports and an FC protocol received by a certain FC port is analyzed by the I/F processing unit 18B-1 and the processor 18F and the received FC protocol is then transferred to the FC port to which the FC device is connected. The memory 18G stores a management program for the SAN switch and this management program performs maintenance, operation, and management of the SAN switch. The management server 14 can perform, for example, setting of configuration information about the SAN switch and updates of the configuration information about the SAN switch by communicating with the SAN switch management program via the LAN I/F 18A. Incidentally, the business server 16 and the storage apparatus 20 may be connected without intermediary of the SAN switch.

The integrated management software 14A of the management server 14 sets an integrated tenant, which extends across the business server 16 and the storage apparatus 20 and is common to both of them, synchronizes setting of a tenant of the business server 16 and a tenant of the storage apparatus 20 with setting of the integrated tenant, and further controls, for example, setting and changing of security among a plurality of integrated tenants in an integrated manner.

Figure 6:
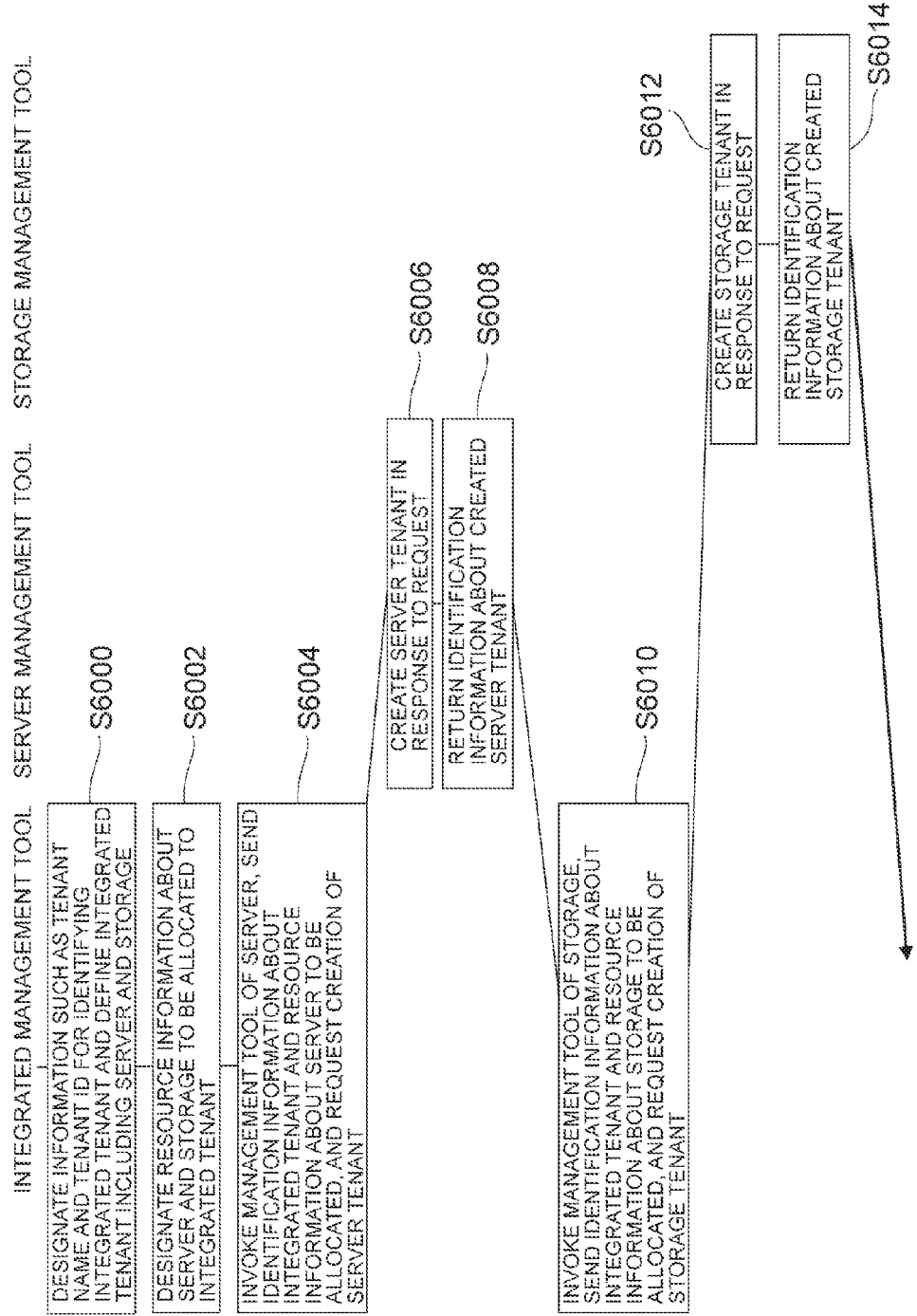
FIG. 6 is a ladder chart illustrating a tenant allocation method for the vertically integrated computer system according to the embodiment.

FIG. 6 is a ladder chart illustrating an embodiment of a tenant allocation method for the vertically integrated computer system. The integrated management tool (the integrated management software 14A of the management server 14) designates tenant identification information such as a tenant name and a tenant ID and sets an integrated tenant including the server 16 and the storage apparatus 20 by integrating the server 16 with the storage apparatus 20.

FIG. 7 is an example of a tenant management table stored in an internal memory of the management server 14. The integrated management tool displays that table via a GUI to a system administrator having the authority to manage the entire integrated system. The system administrator registers tenant identification information (an integrated tenant name and an integrated tenant ID) in the tenant management table in FIG. 7 (FIG. 6: S6000). Then, the system administrator designates necessary server resource information to be allocated to the server tenant (LPAR) constituting the integrated tenant and necessary storage resource information to be allocated to the storage tenant (resource group) constituting the integrated tenant, and registers them in the tenant management table (S6002). The integrated tenant itself is a virtual device (virtual tenant), to which no resource is allocated, and has a role to combine the server tenant with the storage tenant. The server tenant and the storage tenant have a role as logical computers to which computer resources are allocated respectively.

The resources allocated to the server tenant (LPAR) include one or more resources of, for example, CPUs, memories, I/O paths, and the number of CPU cores. Each OS of the server tenant can access the hardware resources allocated to the server tenant via a virtualization function of the hardware resources by means of a hypervisor. The resource information allocated to the storage tenant (resource group) includes one or more resources of, for example, an HDD capacity, a cache capacity, ports, host groups, LDEVs, and/or parity groups. External volumes may be resources which can be allocated.

The management table in FIG. 7 shows a form in which a first tenant (the tenant name: A Bank; and the tenant ID: 0001) and a second tenant (the tenant name: B Ltd; and the tenant ID: 0002) are set to the integrated tenant including the server and the storage apparatus.

The integrated management tool of the management server 14 invokes the management tool 16A of the server 16, refers to the tenant management table in FIG. 7, sends tenant identification information and server resource information, and requests creation of a server tenant (S6004). In response to this request, the management tool 16A of the server 16 creates a first server tenant corresponding to a first integrated tenant and a second server tenant corresponding to a second integrated tenant (S6006). The management tool 16A of the business server 16 records the identification information about the server tenants, which are created in response to the request from the integrated management tool, in a server tenant (LPAR) management table. The server tenant management table is retained in a specified area of the memory 16D-1 for the server. The management tool 16A of the server reads the identification information about the server tenants (LPAR) from the server tenant management table and responds to the integrated management tool (S6008). After receiving this response, the integrated management tool records the server tenant identification information in the tenant management table in FIG. 7. "LPAR1" is first server tenant identification information belonging to the first integrated tenant and "LPAR2" is second server tenant identification information belonging to the second integrated tenant. FIG. 9 is an example of the server tenant management table.

Furthermore, the integrated management tool of the management server 14 invokes the management tool 20B of the storage apparatus 20, refers to the tenant management table (FIG. 7), sends the tenant identification information and the storage resource information, and requests creation of storage tenants (S6010). In response to this request, the management tool 20B of the storage apparatus creates a first storage tenant corresponding to the first tenant and a second storage tenant corresponding to the second tenant (S6012). The storage management tool records the identification information about the storage tenants, which are created in response to the request from the integrated management tool, in a storage tenant (resource group) management table. The storage management tool reads the identification information about the storage tenants from the management table and responds to the integrated management tool (S6014). After receiving this response, the integrated management tool records the storage tenant identification information in the tenant management table in FIG. 7. "RSG1" is first storage tenant identification information belonging to the first integrated tenant and "RSG2" is second storage tenant identification information belonging to the second integrated tenant. The storage tenant management table is retained in a specified area of the shared memory 20E for the storage apparatus. FIG. 10 is an example of the storage tenant management table.

A storage tenant is composed of a combination of ports and storage areas. A storage area is either an LDEV or a parity group or both of them and may be an external volume externally connected to the storage apparatus as necessary. Moreover, the cache capacity may be divided by each storage tenant. The resource information which is set by the integrated management tool to the storage management tool includes the number of ports and the capacity of storage areas for each server tenant. The capacity of storage areas is set by the administrator based on requirement specifications of each server tenant. Incidentally, the storage resource information to be allocated to the integrated tenant may be decided by the storage management tool based on the requirement specifications of each server tenant.

When the computer system sets an integrated tenant including a server and a storage apparatus as a result of the above-described processing, it can set a server tenant by using a resource division function of the server and also set a storage tenant in synchronization of the settings of the server tenant by using a resource division function of the storage apparatus. Since the server tenant and the storage tenant are integrated by the integrated tenant, the storage tenant in the integrated tenant can be exclusively owned by the server tenant in the integrated tenant. Furthermore, confidentiality among a plurality of integrated tenants is maintained reliably by setting security between the server tenant and the storage tenant in the integrated tenant. The management server 14 includes the tenant management table in FIG. 7 and thereby intensively manages, for example, settings, operation, and maintenance of the tenants in the integrated computer system including the server and the storage apparatus.

A system administrator and a tenant administrator are defined as administrators who have the authority to access the integrated management tool. The system administrator has the authority to manage the entire system by, for example, setting the integrated tenant, setting the server resource information, setting the storage resource information, and setting security between the server tenant and the storage tenant. The tenant administrator has the management authority within the integrated tenant associated with the tenant administrator themselves.

FIG. 8 is a ladder chart illustrating an example of processing for setting security by associating the server tenant with the storage tenant in the integrated tenant. The processing in FIG. 8 may be executed following the processing in FIG. 6.

After the completion of the tenant allocation processing illustrated in FIG. 6 and as triggered by input by the system administrator, the integrated management tool sets LUN security so that the server tenant and the storage tenant which constitute the same integrated tenant can access to each other. Then, the integrated management tool 14A refers to the tenant management table (FIG. 7) and inquires of the management tool 16A of the server about port information included in the server tenant, that is, an HBA list (HBA WWN list) about each integrated tenant (S8000).

The server management tool 16A executes functions of the OS or functions of the HBA driver for each server tenant (LPAR), checks WWNs of the HBAs included in each server tenant, and records the acquired WWN list in the management table. Subsequently, the server management tool refer to the server management table and returns the HBA WWN list for each server tenant to the integrated management tool (S8002).

How to recognize the WWNs of the HBAs varies depending on the differences in the types of the OS for the server and vendors of the HBAs. If the OS is Solaris (trademark) and when the server management tool inputs an OS command to the OS, HBA information including the WWNs is returned as response information to that command. WWN addresses may be recognized by utility software of the HBAs.

After receiving the HBA WWN list from the server management tool 16A, the integrated management tool 14A records the HBA WWN list for each server tenant in a LUN security management table (FIG. 11). The LUN security table is stored in a specified area of the memory for the management server 14. The LUN security management table is constituted from an integrated tenant ID, a server tenant ID, an HBA WWN list, and a storage tenant ID in such a manner that they correspond to each other.

After finishing registering the HBA WWN list for all the server tenants in the LUN security management table, the integrated management tool then sends the information about the LUN security management table to the storage management tool and requests the storage management tool 2B to set the LUN security (S8004). After receiving the LUN security setting command, the storage management tool registers a WWN list of the server tenant as a host group for the storage tenant constituting the same integrated tenant as the relevant server tenant. The storage management tool records the host group in a host group definition table in the shared memory 20E. A host group ID and a WWN list belonging to the relevant host group are recorded in the host group definition table. Subsequently, the storage management tool sets an LU (Logical Unit) based on the resources allocated to the storage tenant corresponding to the host group or registers identification information about the host group and LU identification information (LUN: Logical Unit Number) with respect to LUs in the storage tenant in the LUN security definition table (S8006).

The LUN security is a technique to protect LUs from false access or unauthorized access from the host by showing or not showing the volumes (LUs) to the server (host). When the host accesses an LU in the storage apparatus, the microprogram for the storage apparatus checks host port information (WWN) of a host command and an LU address against the table and performs access control over the host command. FIG. 12 is an example of the host group definition information table and FIG. 13 is an example of the LUN security definition table. For example, when HBAs of a Linux (registered trademark) server are defined as a host group 1 and HBAs of an AIX server are defined as a host group 2, the Linux server can access LU1, but cannot recognize LU2. The AIX server can access LU2, but does not recognize LU1. After receiving a read/write command from the server, the microprogram of the storage apparatus refers to the host group definition table and the LUN security definition table and decides whether the host can access the LUs or not. The LUN security is set to the storage tenant with respect to the server tenant constituting the same integrated tenant as a result of the processing in FIG. 8, thereby achieving security among a plurality of integrated tenants.

Figure 14:
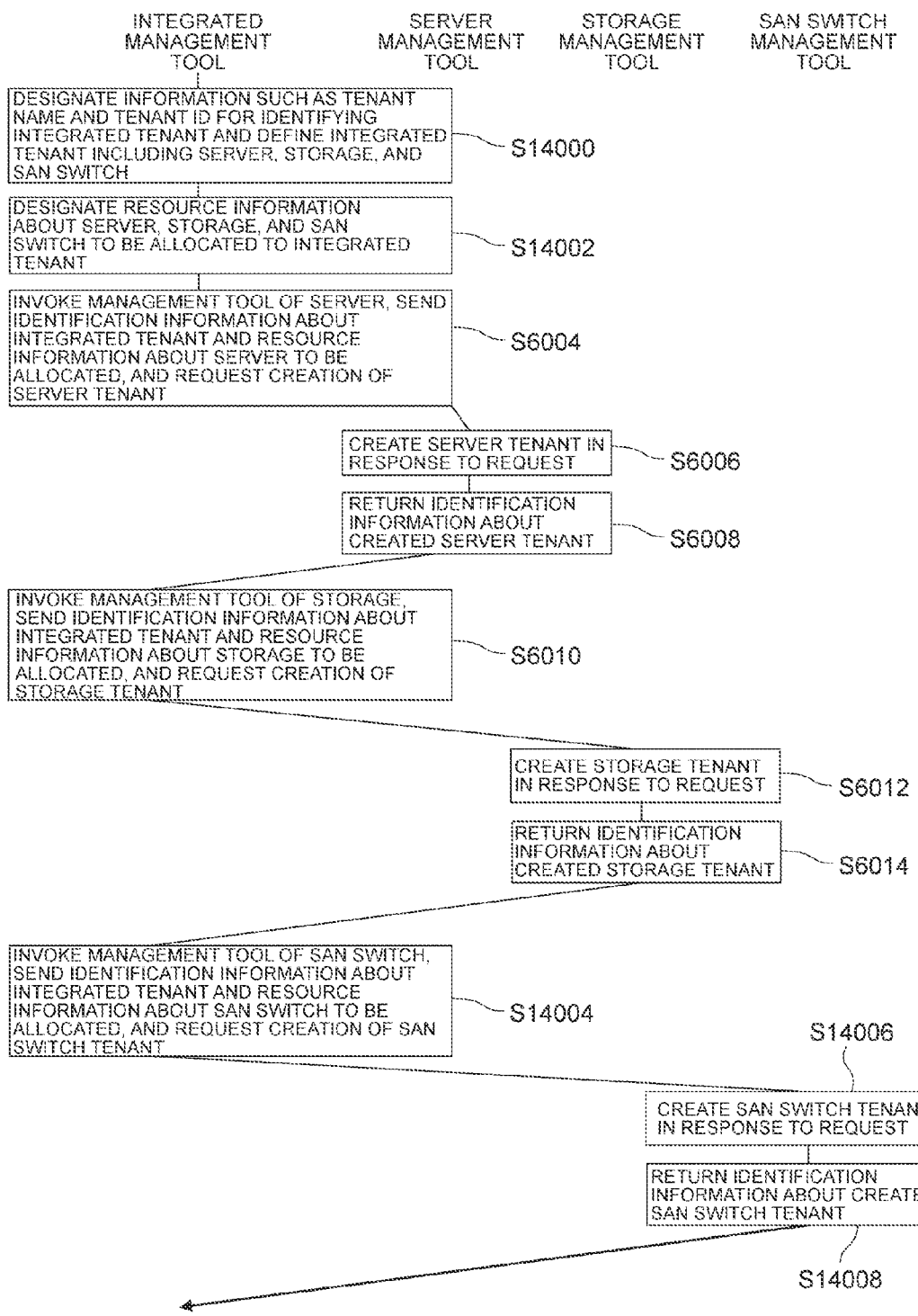
FIG. 14 is a ladder chart showing an example of a method for allocating the integrated tenant to the server, the storage apparatus, and a SAN switch.

Next, an explanation will be given below about an embodiment according to which in addition to setting of tenants to the server and the storage apparatus, the same integrated tenant as the server and the storage apparatus is set to a SAN switch. As the management server 14 sets a tenant to the SAN switch, it can deal with the multi-tenant also at the level of the switch. FIG. 14 is a ladder chart illustrating a method of allocating an integrated tenant to the server 16, the storage apparatus 20, and the SAN switch 18. The same reference numeral is given to the same processing as the chart described earlier (FIG. 6) and an explanation about such processing has been omitted.

The integrated management tool 14A of the management server 14 designates information such as the tenant name and the tenant ID for identifying an integrated tenant and defines the tenant including the server 16, the storage apparatus 20, and the SAN switch 18 (S14000). The integrated management tool designates resource information about the SAN switch to be allocated to the integrated tenant (S14002). The integrated management tool records the resource information in a SAN switch resource information column of a tenant management table shown in FIG. 15. An example of the resource information for setting the tenant at the SAN switch is a bandwidth.

The integrated management tool invokes the management tool of the SAN switch 18, reads the identification information about the integrated tenant and resource information about the SAN switch to be allocated, from the tenant management table (FIG. 15), sends them to the SAN switch management tool, and requests the SAN switch management tool to create a SAN switch tenant (S14004). The management tool of the SAN switch is realized by the processor 18F recorded in the management program in the memory 18G.

In response to the request from the integrated management tool, the SAN switch management tool creates the SAN switch tenant, registers the SAN switch tenant and the resource information, which is allocated to the SAN switch tenant, in the management table (S14006). The management tool of the SAN switch reads the management table and returns the identification information about the SAN switch tenant to the integrated management tool (S14008). The SAN switch management tool creates a SAN switch tenant for each integrated tenant. The integrated management tool registers the tenant identification information (SAN1, SAN2), which has been sent from the SAN switch management tool, in the tenant management table shown in FIG. 15.

Since the integrated tenant which is common to the server and the storage apparatus can be also set to the SAN switch as a result of the above-described processing, the integrated management tool can set the security function to the SAN switch tenant via the SAN switch management tool so that the server tenant and the storage tenant in the same integrated tenant can access each other, but cannot access a server tenant or a storage tenant in a different integrated tenant.

FIG. 16 is a ladder chart for that purpose. The integrated management tool 14A refers to the tenant management table (FIG. 15) and requests the HBA WWN list for each integrated tenant from the server management tool 16A. The server management tool refers to the management table in the memory, reads WWNs of HBAs of the server tenant corresponding to the integrated tenant, and sends them to the integrated management tool. The integrated management tool registers the HBA WWN list corresponding to the integrated tenant ID and the server tenant ID in the security management table in FIG. 17. Incidentally, if the HBA WWN list is registered in the security management table in FIG. 17 by the aforementioned setting of the LUN security, the processing by the integrated management tool for collecting the WWN list via the server management tool is unnecessary.

Furthermore, the integrated management tool 14A refers to the tenant management table (FIG. 15) and requests an FC port WWN list of the storage tenant for each integrated tenant from the storage management tool 20B. The storage management tool refers to the management table in the shared memory 20E, reads WWNs of FC ports belonging to the storage tenant corresponding to the integrated tenant, and sends them to the integrated management tool. The integrated management tool registers the FC port WWN list corresponding to the integrated tenant ID and the server tenant ID in the security management table in FIG. 17.

Subsequently, the integrated management tool 14A refers to the security management table (FIG. 17), sends the SAN switch tenant ID, the HBA WWN list of the server tenant and the FC port WWN list of the storage tenant corresponding to the SAN switch tenant ID to the SAN switch management tool, and issues a command to set zoning of the SAN switch (S16000).

The SAN switch management tool sets zoning of ports in the SAN switch for each SAN switch tenant ID so that only HBAs of the server tenant and FC ports of the storage tenant in the same integrated tenant can communicate each other; and registers information about the port zoning in the internal management table. Incidentally, other than the form where zoning for the SAN switch is performed on a port basis, there is a form where zoning is set between WWNs of the host device (HBA) and WWNs of the storage device (port) (WWN zoning). If the WWN zoning is used, the zoning will be maintained even if the host device and/or the storage device are reconnected to a different port of the SAN switch.

Incidentally, the integrated management tool may request the server management tool to set an artificial WWN including the tenant identification information as WWN information about the HBAs in the tenant. The WWN of this case is composed of a vendor ID, a tenant ID, and a serial number. Since the WWN of the HBA includes the tenant ID, the microprogram for the storage apparatus can acquire tenant information from the WWN of a server command. Incidentally, the integrated management tool may set security to the integrated tenant by combining the SAN switch zoning with the aforementioned LUN security. In this case, the LUN security may be set before or after setting of the SAN switch zoning or setting of the LUN security and setting of the SAN switch zoning may be performed at the same time. Furthermore, either setting of the LUN security or selling of the SAN switch zoning may be performed.

Figure 18:
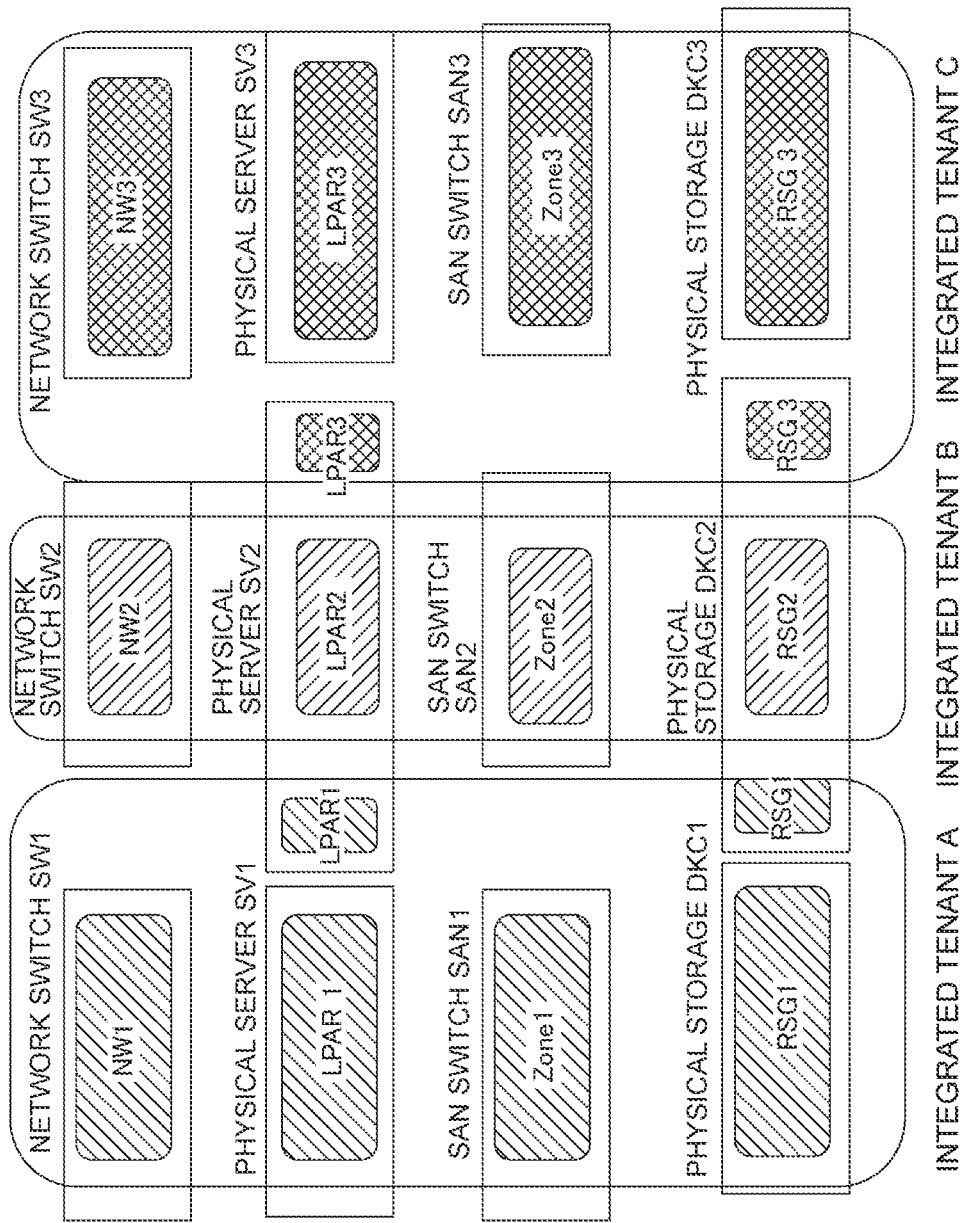
FIG. 18 is a block diagram of a system form where a plurality of integrated tenants are formed in a vertically integrated system composed of a plurality of network switches, a plurality of SAN switches, and a plurality of physical servers.

FIG. 18 is a block diagram of a system form in which a plurality of integrated tenants are formed in a vertically integrated system composed of a plurality of network switches, a plurality of physical servers, a plurality of SAN switches, and a plurality of physical servers. Integrated tenant A is formed by extending vertically across a network switch SW1, physical servers SV1, SV2, a SAN switch SAN 1, and also physical storage units DKC1, DKC2. NW1 is a local tenant formed in the network switch SW1, LPAR1 is a local tenant (logical partition) formed in the physical servers SV1 and SV2, Zone1 is a local tenant formed in the SAN switch SAN 1, and RSG1 is a local tenant (resource group) formed in the physical storage units DKC1 and DKC2.

Integrated tenant B is formed by extending vertically across a network switch SW2, a physical server SV2, a SAN switch SAN2, and a physical storage unit DKC2. NW2 is a local tenant of the network switch SW2, LPAR2 is a local tenant of the physical server SV2, Zone2 is a local tenant of the SAN switch SAN2, and RSG2 is a tenant of the physical storage units DKC2.

Integrated tenant C is formed by extending vertically across a network switch SW3, physical servers SV2, SV3, a SAN switch SAN3, and physical storage units DKC2, DKC3. NW3 is a local tenant formed in the network switch SW3, LPAR3 is a local tenant formed in the physical servers SV2 and SV3, Zone3 is a local tenant formed in the SAN switch SAN3, and RSG3 is a local tenant formed in the physical storage units DKC2 and DKC3.

In this way, the computer system can be formed so that one integrated tenant extends across a plurality of physical servers and a plurality of physical storage units. In order to do so, the integrated management tool may be designed to be capable of defining resource groups in a virtual storage apparatus composed of a plurality of physical storage units. Referring to the aforementioned example, LPAR1 is set to a first virtual server composed of the physical server SV1 and the physical server SV2, LPAR2 is set to a second virtual server composed of the physical server SV2, LPAR3 is set to a third virtual server composed of the physical server SV2 and the physical server SV3, RSG1 is set to a first virtual storage apparatus composed of the physical storage unit DKC1 and the physical storage unit DKC2, RSG2 is set to a second virtual storage apparatus composed of the physical storage unit DKC2, and RSG3 is set to a third virtual storage apparatus composed of the physical storage unit DKC2 and the physical storage unit DKC3. Regarding tenants formed at network switches and SAN switches, a tenant may be formed so that it extends across a plurality of network switches and a plurality of SAN switches.

A local tenant ID of each component (such as a network switch, a server, a storage apparatus, and a SAN switch) which constitutes the integrated tenant is composed by composing a physical ID (equipment ID such as a production number or a device ID) and a partition (group) ID of each component (an LPAR ID in the server or a resource group ID in the storage apparatus), so that the local tenant ID becomes unique in the vertically integrated system, which is favorable. FIG. 19 is an example of the local tenant ID of each component.

Along with update, enhancement, downsizing, and maintenance of equipment in the vertically integrated system, the need arises to migrate local tenants, which constitute the integrated tenant, between a plurality of components. An example case is where tenant a of the server is migrated from physical server A to physical server B and tenant b is migrated from physical server B to physical server A. When the physical positions of resources for the local tenants are changed and the WWNs and the addresses of HBAs and the FC ports are composed of physical information, it is necessary to reset the LUN security and the WWN zoning. So, the server management tool may create a server tenant by means of, for example, NPIV (N-Port ID Virtualization) by using a virtual HBA in response to a tenant creation request from the integrated management tool. The storage management tool may also form a virtual FC port address in the same manner and create a server tenant by using this virtual FC port address. If the HBA and the FC port address are formed virtually, the server tenant and the storage tenant can assume the HBA or the FC port address at a migration destination even if the server tenant and the storage tenant are migrated between the plurality of components. So, it is unnecessary to reset the LUN security or the WWN zoning.

The aforementioned embodiment has described the network interface between the business server and the storage apparatus as being Fibre Channel; however, the network interface may be a LAN interface such as PCI Express to construct a vertically integrated computer system. Moreover, the server and the storage apparatus may be virtualized respectively and one or more physical computers may be used to construct the aforementioned integrated computer system. Furthermore, the integrated computer system may be composed of a plurality of physical computers and the system may be configured so that one physical computer can be changed to a server or a storage apparatus.

REFERENCE SIGNS LIST

10 vertically integrated computer system; 12 network switch; 14 management server, 16 business server; 18 SAN switch; and 20 storage apparatus.

The invention claimed is:

1. An integrated computer system in which a business server and a storage apparatus providing the business server with a storage area are integrated and operated, the integrated computer system comprising a management server for managing the business server and the storage apparatus, and a switch between the business server and the storage apparatus for relaying communication between them, wherein the management server sets an integrated tenant extending across the business server and the storage apparatus;

wherein the business server sets a server tenant belonging to the integrated tenant;

wherein the storage apparatus sets a storage tenant belonging to the integrated tenant;

wherein the switch sets a switch tenant belonging to the integrated tenant;

wherein the server tenant and the storage tenant are configured to be associated with each other by the integrated tenant;

wherein the switch tenant is configured to be associated with the server tenant and the storage tenant by the integrated tenant;

wherein the management server transmits identification information about the integrated tenant and resource information, which is allocated to the server tenant, about the business server to the business server;

wherein upon receipt of the transmission, the business server sets the server tenant and transmits identification information about the set server tenant to the management server;

wherein the management server transmits the identification information about the integrated tenant and resource information, which is allocated to the storage tenant, about the storage apparatus to the storage apparatus;

wherein upon receipt of the transmission, the storage apparatus sets the storage tenant and transmits identification information about the set storage tenant to the management server;

wherein the management server transmits the identification information about the integrated tenant and resource information, which is allocated to the switch tenant, about the switch to the switch;

wherein upon receipt of the transmission, the switch sets the switch tenant and transmits identification information about the set switch tenant to the management server;

wherein the management server acquires port information about the server tenant, acquires port information about the storage tenant, and transmits the acquired port information about the server tenant and the acquired port information about the storage tenant to the switch; and wherein the switch sets zoning to a port in the switch based on the received port information so that a port of the server tenant and a port of the storage tenant can access each other.

2. The integrated computer system according to claim 1, wherein the management server has a management table in which the identification information about the integrated tenant, the identification information about the server tenant, the identification information about the storage tenant, the resource information, which is allocated to the server tenant, about the business server, the resource information, which is allocated to the storage tenant, about the storage apparatus are registered.

3. The integrated computer system according to claim 1, wherein the management server acquires port information about the server tenant and transmits the acquired port information to the storage apparatus; and wherein the storage apparatus sets security for controlling access from the business server to the storage apparatus between a volume of the storage tenant and the port information based on the received port information.

4. The integrated computer system according to claim 1, wherein the management server registers the identification information about the switch tenant and the resource information, which is allocated to the switch tenant, about the switch in a management table.

5. The integrated computer system according to claim 1, further comprising a plurality of business servers and a plurality of storage apparatuses wherein a plurality of integrated tenants are formed in the plurality of physical servers and a plurality of storage apparatuses.

6. The integrated computer system according to claim 1, wherein the management server has a management table in which the identification information about the integrated tenant, the identification information about the server tenant, the identification information about the storage tenant, the identification information about the switch tenant, the resource information, which is allocated to the server tenant, about the business server, the resource information, which is allocated to the storage tenant, about the storage apparatus, and the resource information, which is allocated to the switch tenant, about the switch are registered; and wherein the management server acquires port information about the server tenant and transmits the acquired port information to the storage apparatus, the storage apparatus sets security between a volume of the storage tenant and the port information based on the received port information to control access from the business server to the storage apparatus.

7. A method for having a management server control an integrated computer system in which a business server and a storage apparatus providing the business server with a storage area are integrated and operated, wherein the integrated computer system comprises a switch between the business server and the storage apparatus for relaying communication between them, wherein the management server sets an integrated tenant extending across the business server and the storage apparatus;

wherein the business server sets a server tenant belonging to the integrated tenant;

wherein the storage apparatus sets a storage tenant belonging to the integrated tenant;

wherein the switch sets a switch tenant belonging to the integrated tenant;

wherein the server tenant and the storage tenant are configured to be associated with each other by the integrated tenant;

wherein the switch tenant is configured to be associated with the server tenant and the storage tenant by the integrated tenant;

wherein upon receipt of the transmission, the business server sets the server tenant and transmits identification information about the set server tenant to the management server;

wherein the management server transmits the identification information about the integrated tenant and resource information, which is allocated to the storage tenant, about the storage apparatus to the storage apparatus;

wherein upon receipt of the transmission, the storage apparatus sets the storage tenant and transmits identification information about the set storage tenant to the management server;

wherein the management server transmits the identification information about the integrated tenant and resource information, which is allocated to the switch tenant, about the switch to the switch;

wherein upon receipt of the transmission, the switch sets the switch tenant and transmits identification information about the set switch tenant to the management server;

wherein the management server acquires port information about the server tenant, acquires port information about the storage tenant, and transmits the acquired port information about the server tenant and the acquired port information about the storage tenant to the switch; and wherein the switch sets zoning to a port in the switch based on the received port information so that a port of the server tenant and a port of the storage tenant can access each other.

* * * * *